2,974,123
PROCESS FOR PREPARING ACRYLONITRILE POLYMERS

Charles Clifford Ketterer, Waynesboro, Va., assignor to E. I. du Pont de Nemours and Company, Wilmington, Del., a corporation of Delaware No Drawing. Filed Feb. 5, 1957, Ser. No. 638,223

6 Claims. (Cl. 260—63)

This invention relates to an improved process for the polymerization of acrylonitrile and more particularly to the production of acrylonitrile polymers and copolymers of improved heat discoloration characteristics while maintaining relatively high rates of conversion.

Production of acrylonitrile polymers and copolymers has generally been carried out by "Redox" polymerization, e.g. with potassium persulfate as the catalyst or initiator and sodium metabisulfite as the activator. The ratio of activator to catalyst has been below about 2:1 to attain good rates of conversion of monomer to polymer but under such conditions the polymer produced is not as color stable as is desired and filaments and fibers produced therefrom have a yellowish cast. To overcome this deficiency it has been demonstrated that whiter polymeric fibers result when the polymerization is carried out at relatively high ratios of activator to catalyst, for example, with six or eight or more times as much bisulfite activator as persulfate catalyst. Such processes, however, are carried out at reduced rates of conversion and when the monomer feed is increased to maintain satisfactory production rates, the slurry of polymer becomes too thick to handle. The process of the present invention provides a way of producing polymer relatively stable to discoloration on heating, at satisfactory rates of conversion and without developing thick slurries of polymer.

Therefore, an object of this invention is to provide an improved process for polymerization of acrylonitrile polymers and copolymers containing at least 85% acrylonitrile to produce more color stable polymer and without substantial reduction in rate of conversion. Other objects will be apparent from the description that follows.

These objects are accomplished by polymerizing acrylonitrile monomer with or without minor amounts of other polymerizable monomers in the presence of a persulfate as the catalyst, a sulfoxy-reducing agent as the activator, from 0.05% to 0.30% of β-mercaptoethanol, and from 0.2 to 5 parts per million of iron (based on total feed to the reactor). Polymerization is carried out in aqueous medium wherein the ingredients at the start of the reaction or in the feeds to a continuous reaction and the reaction conditions may range in quantity as indicated in the table below.

| | |
|---|---|
| Percent total monomers | 18.5 to 35 |
| P.p.m. ionic iron | 0.2 to 5 |
| Percent [1] beta-mercaptoethanol | 0.05 to 0.3 |
| Percent [1] activator as sodium meta-bisulfite [2] | 0.2 to 3.8 |
| Percent [1] catalyst as potassium persulfate | 0.2 to 0.7 |
| Temperature (° C.) | 45 to 60 |
| Residence time (min.) | 30 to 110 |
| Water to balance acidified with sulfuric acid to pH of | 1.8 to 3.75 |

[1] Based on monomers.
[2] Stoichiometric equivalent amounts of $SO_2$ may be substituted for sodium meta-bisulfite. If $SO_2$ is used, no acid is necessary for lowering pH.

The invention is largely concerned with polymers which, when dissolved and spun or cast into filaments, yarns, fibers, films and the like, produce relatively white products. A measure of the ultimate whiteness of the products can be preliminarily determined by measuring the color stability of the polymer after being heated in solution which test is termed "heated color value" and abbreviated to HCV for convenience. This test consists in heating a 25% solution of the polymer in pure N,N-dimethylformamide at 100° C. for 4 hours and then testing this sample, diluted to a concentration of 5.8% polymer, by measuring its optical density at 400 millimicrons against a sample of pure solvent using a Beckman Model DU Spectrophotometer. The optical density times 100 is taken as the heated color value of the polymer. The lower this value, the more stable the polymer is to heat degradation and whiter the fiber produced therefrom by normal production methods. Heated color values below about 12 are considered satisfactory for the production of white products.

Polymerization is preferably carried out in a continuous polymerizer but a batch reactor may also be used. The process may be used in preparing homopolymers of acrylonitrile or copolymers of acrylonitrile and an ethylenically unsaturated monomer wherein the acrylonitrile content is not less than 85%. Some copolymerizable ethylenically unsaturated monomers that may be used are vinyl acetate, methyl vinyl ketone, methyl acrylate, methyl methacrylate, butyl acrylate, butyl methacrylate, dimethyl itaconate, diethyl maleate, vinyl trimethylacetate, methacrylonitrile, styrene, vinyl ethyl hexyl ether, styrenesulfonic acid, ethylenesulfonic acid, allylsulfonic acid, etc. and their alkali metal salts. Two or more copolymerizable monomers may be used as desired.

The following example is given by way of illustration and no limitation is placed on the particular polymers or catalyst or activator, since any acrylonitrile copolymer having at least 85% acrylonitrile content may be substituted for the polymers given in the example. Likewise, any ammonium or alkali metal salt may be used in place of the sodium or potassium salt of metabisulfite and persulfate. Other sulfoxy reducing agents may be used alone or in part as the activator such as sodium bisulfite, sodium hydrosulfite, sulfur dioxide and the like.

EXAMPLE

A series of continuous polymerization runs were made. In each case the run was started with the overflow polymerizing kettle partly filled with demineralized water, acidified with sulfuric acid to a pH of about 3.25 and heated to a predetermined temperature. Then were added the monomers, and dilute aqueous solutions of potassium persulfate as the catalyst or initiator, sodium metabisulfite as the activator, β-mercaptoethanol, iron in the form of ferrous ammonium sulfate hexahydrate (when added) together with sufficient demineralized water and sulfuric acid to maintain the desired concentration and a constant pH in the range of from 3.1 to 3.5. In the table that follows the various percent of feeds are given together with the percent conversion of monomer to polymer, the intrinsic viscosity ($\eta$) and HCV of the polymer, consistency of the polymer slurry, residence time and temperature of the reaction. In all cases each reaction mixture contains about 0.2 part per million of iron over and above any amount of added iron.

Continuous polymerizations

| Expt. | Percent Conversion | HCV | Percent Catalyst[1] | Percent Activator[1] | Percent ME[1] | Percent Monomer Feed | p.p.m. Fe Added | Residence Time (min.) | Remarks |
|---|---|---|---|---|---|---|---|---|---|
| 1 | 64.4 | 8.1 | 0.34 | 4.00 | 0.00 | 18.5 | 0.00 | 53.4 | 94% AN—6% MA: 0.27% SSA based on AN and MA. |
| 2 | 83.7 | 16.5 | 0.57 | 0.97 | 0.00 | 30.0 | 0.00 | 73 | 94% AN—6% MA. |
| 3 | 21.6 | 18.3 | 0.35 | 0.00 | 0.10 | 25.0 | 1.00 | 72.6 | Same as 1 above. |
| 4 | 78.7 | 8.4 | 0.63 | 1.07 | 0.10 | 30.0 | 0.00 | 62.7 | 94% AN—6% MA: 0.23% SSA based on AN and MA. |
| 5 | 78.9 | 11.0 | 0.50 | 0.353 | 0.10 | 35.0 | 0.19 | 65.7 | Same as 1 above. |
| 6 | 77.9 | 10.9 | 0.55 | 3.00 | 0.11 | 30.0 | 0.90 | 27 | 94% AN—6% MA: 0.33% SSA based on AN and MA. |
| 7 | 75.5 | 11.50 | 0.45 | 3.00 | 0.11 | 30.0 | 0.90 | 28.1 | Same as 6 above. |
| 8 | 77 | 10.0 | 0.2 | 0.2 | 0.10 | 24.0 | 0.3 | 80 | 97.95% AN, 2.05% SSA. |

[1] Based on Monomer.
ME=beta mercaptoethanol.
AN=acrylonitrile.
MA=methyl acrylate.
SSA=sodium styrenesulfonate.
The intrinsic viscosity of the polymers formed in the above experiments varied between 1.30 and 2.20.
The slurry consistency was thin in all of the experiments except Experiment 1 in which it was thick.
The temperature was 45° C. in Experiment 1 and 60° C. in Experiment 7—all the rest were carried out at 48° C.
The filtrate from Expt. 8 possessed one-tenth of the biological oxygen demand (BOD) of the filtrate from Expt. 1.

Experiment 1 shows that good color but thick slurry consistency and low conversion were obtained by the use of the high ratio of activator to initiator and without any β-mercaptoethanol present. Experiment 2 shows good conversion and thin slurry consistency but poor color obtained with a low ratio of activator to initiator and without any β-mercaptoethanol present. Experiment 3 shows por color and poor conversion when the recipe is conducted with a small amount of β-mercaptoethanol and without activator. Experiment 4 shows good color, satisfactory conversion and thin slurry consistency when a low ratio of activator to catalyst is used with a small amount of β-mercaptoethanol. Experiment 5 shows that a 35% monomer feed may be used and still have a relatively thin polymer slurry, a satisfactory polymer color and good conversion even though the activator/initiator ratio is very low when a small amount of β-mercaptoethanol is present. Experiment 6 shows good conversion, satisfactory color and thin slurry consistency obtained in a short time when a high ratio of activator to initiator is used with a small amount of β-mercaptoethanol. Experiment 7 shows that an elevated temperature may be used for a short residence time with little effect on color, conversion and slurry consistency when a high ratio of activator to initiator is used with 0.3% β-mercaptoethanol. However, the small reduction in conversion indicates that the higher amount of β-mercaptoethanol offers no advantage over a small amount such as used in Experiments 4 to 6. Experiment 8 shows that other ethylenically unsaturated monomers (in this case, styrenesulfonic acid) may be used and shows the reduced amounts of ingredients (i.e., total of catalyst, activator, β-mercaptoethanol and iron) possible using this invention. Experiment 8 also shows the relatively low BOD of the filtrate using this recipe.

This invention enables the production of polymers of acrylonitrile containing at least 85% acrylonitrile at good rates of conversion and with good color stability without having to contend with thick polymer slurries. The improved color stability of the polymer, which means improved whiteness of the filaments, fibers, and the like produced therefrom, makes the products of this invention admirably suited for all kinds of fine textiles especially for white goods or goods to be dyed in pastel shades.

It will be apparent that many widely different embodiments of this invention may be made without departing from the spirit and scope thereof, and therefore it is not intended to be limited except as indicated in the appended claims.

I claim:
1. The method of producing substantially white acrylonitrile polymers which comprises polymerizing a reaction mass containing from 18.5% to 35% of monomers selected from the group consisting of acrylonitrile and a mixture of ethylenically unsaturated monomers containing at least 85% acrylonitrile and up to 15% of a copolymerizable monomer, from 0.2 to 5 parts per million of a soluble iron compound calculated as Fe, from 0.05% to 0.3% of beta-mercaptoethanol, from 0.2% to 3.8% of a sulfoxy reducing agent as an activator, from 0.2% to 0.7% of a persulfate as a catalyst, the balance being water, acidifying the mass with sulfuric acid until a pH of from 1.8 to 3.75 is obtained, heating the acidified solution from about 30 to 110 minutes at a temperature of about 45° to 60° C., and separating the polymer so formed, the percentage of the beta-mercaptoethanol, activator and catalyst being based on the weight of the monomers.

2. The process of claim 1 in which the activator is an alkali metal metabisulfite.

3. The process of claim 1 in which the activator is sodium metabisulfite.

4. The process of claim 1 in which the catalyst is an alkali metal persulfate.

5. The process of claim 1 in which the catalyst is potassium persulfate.

6. The process of claim 1 in which the iron is added in the form of ferrous ammonium sulfate.

References Cited in the file of this patent

UNITED STATES PATENTS

| | | |
|---|---|---|
| 2,436,926 | Jacobson | Mar. 2, 1948 |
| 2,684,357 | Troyan et al. | July 20, 1954 |
| 2,743,263 | Coover et al. | Apr. 24, 1956 |
| 2,748,106 | Scheiderbauer et al. | May 29, 1956 |
| 2,777,832 | Mallison | Jan. 15, 1957 |
| 2,793,200 | West | May 21, 1957 |

OTHER REFERENCES

Thomas et al.: "Journal of Polymer Science," volume 17, pages 275–290.